United States Patent Office 3,436,241
Patented Apr. 1, 1969

3,436,241
PROCESS FOR TREATING PIGMENT PARTICLES
George G. Durrant, Falchenham Cottage, Stallingborough Road, Healing, Lincolnshire, England
No Drawing. Filed Aug. 4, 1966, Ser. No. 570,164
Claims priority, application Great Britain, Aug. 20, 1965, 35,848/65
Int. Cl. C09c 3/00, 3/02
U.S. Cl. 106—308                                                     9 Claims

ABSTRACT OF THE DISCLOSURE

A process for treating pigment particles by contacting the pigment particles with a cycloalkane compound having the formula $$HO-R-(C_nH_{2n}OH)_m$$

wherein R is a cycloalkane nucleus, $n$ is an integer of at least 1, $m$ is an integer of at least 2, and the hydroxyl group is attached directly to a ring carbon atom of said cycloalkane nucleus.

---

The present invention relates to the treatment of pigments. More particularly, it relates to the treatment of pigments to improve the gloss and/or hiding power of a paint or lacquer containing the same as well as to improve the water dispersibility of the pigment and/or its dispersibility in the paint or lacquer medium.

Broadly, the present invention provides a process for the treatment of pigment particles which comprises contacting said particles with a cycloakane compound having the following general formula:

$$HO-R-(C_nH_{2n}OH)_m$$

wherein R is a cycloalkane nucleus, $n$ is an integer of at least 1, $m$ is an integer of at least 2, and the hydroxyl group is attached directly to a ring carbon atom of said cycloalkane nucleus.

The compound may be used in a quantity of from 0.01 to 5 percent, preferably 0.1 to 1.0 percent, calculated on the weight of the pigment.

The cycloalkane compounds used in the present invention may contain further substituents, especially halogen atoms, or alkyl or amino groups, and the cycloalkane nucleus may contain more than one hydroxy-substituted carbon atom. Further, any one of the carbon atoms in the cycloalkane nucleus may carry one or, especially, two hydroxyalkyl groups, and the hydroxyl group or groups, the hydroxyalkyl groups and other substituents may be in any positions in the cycloalkane nucleus; preferably, however, at least one hydroxyalkyl group is attached to a ring carbon atom adjacent to a ring carbon atom carrying a hydroxyl group.

Particularly satisfactory compounds include polyalkylol-cyclohexanols and polyalkylol-cyclopentanols. The alkylene radicals in the alkylol groups are preferably lower alkylene radicals containing up to 3 carbon atoms, especially methylene groups, and the compounds may contain, for example, two, three or, especially four alkylol groups. The alkyl radicals in the alkylol groups may be the same or different.

Further particularly satisfactory compounds include cycloalkanes having the formulae:

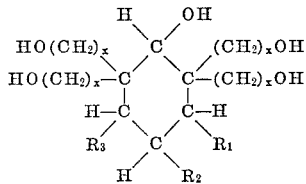

and

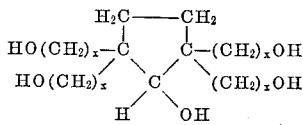

wherein $R_1$, $R_2$ and $R_3$ are independently selected from the group consisting of hydrogen and alkyl and $x$ is an integer from 1 to 3.

Examples of particularly useful compounds include 2,2,6-6-tetramethylol-cyclohexanol; 2,2,6,6-tetramethylol-4-methyl-cyclohexanol; 2,2,5,5 - tetramethylol-cyclopentanol; 2,2,6,6-tetramethylol-3,4-dimethyl-cyclohexanol and 2,2,6,6-tetra-(3-hydroxypropyl)-cyclohexanol.

The preparation of 2,2,6,6-tetramethylol-cyclohexanol is described in "Organic Syntheses" Collective Volume 4, Editor-in-Chief Norman Rabjohn (published by John Wiley & Sons Inc.) at pages 907 and 909.

The pigment advantageously comprises titanium dioxide and may be anatase or rutile titanium dioxide, a composite pigment containing titanium dioxide, or a colored pigment containing titanium dioxide. The anatase or rutile titanium dioxide may be pure, or small quantities of hydrated metal oxides, for example, hydrated alumina or a hydrated oxide of titanium, may be present on the surfaces of the particles. Other pigments that may be treated in accordance with the process of the invention include silica, blanc fixe (barium sulfate), lithopone, barium carbonate, zirconia, zinc oxide, aluminum oxide, chrome yellow and phthalocyanine.

The pigment particles preferably are treated with a cycloalkane compound in the liquid state, namely, with a compound which is itself a liquid or with a solution of the compound (whether solid or liquid) in a suitable solvent such as, for example, an alcohol, acetone, or water. In the case of treatment with a solution, the solvent is subsequently removed from the treated particles. The pigment particles may be dry before the treatment. However, they preferably are mixed with water to form a paste, pulp or slurry. The particles may alternatively be treated with a dispersion of a liquid compound in another liquid.

The mixture of particles and treating compound should be agitated to insure uniform distribution of such compound over the surface of the particles. Thorough mixing of the pigment particles or of the paste, pulp, or slurry of the same with the treating compound or with the solution of the compound is necessary in order to contact all the particles substantially uniformly. The length of the mixing operation, the type of mixer used and the rate of mixing all are important considerations in achieving such desired uniform contact.

After the compound has been contacted with the pigment particles, the particles are preferably dried at a temperature within the range of from about 100° C. to about 180° C., preferably within the range of from about 105° C. to about 130° C. The temperature chosen, however, should not be so high that charring occurs thereby causing discoloration of the pigment. The drying step removes from the particles any water that may be present as well as any organic solvent for the treating compound, should any have been used. After drying, the treated particles may be milled in order to break down any agglomerates of particles that may have been formed.

One preferred process for the treatment of pigment in accordance with this invention comprises adding the treating compound to a pulp of titanium dioxide particles, the surface of which have associated therewith, for example, hydrous oxides of aluminum and titanium. The solids content of such a pulp should be in the range of about 30 to 65 percent, preferably about 60 percent, by weight. If the solids content is at the lower end of this range it is necessary to agitate the material during drying to avoid wide variations in the distribution of the treating compound throughout the dried solid. Mixing of the added cycloalkane compound and titanium dioxide pulp may be conveniently carried out in a paste blender when a pulp of about 60 percent solids content is used, in view of the high viscosity of the system. Addition of treating agent can be made either to the pulp before mixing or, more conveniently, directly to the blender. The mixing time should be, for example, from 5 to 60 minutes, although the preferred time will be dependent on the efficiency of the mixer. We have found in our investigation that a mixing time of 30 minutes is generally suitable.

The addition of the treating compound is conveniently made in the course of known surface coating procedures after the titanium dioxide particles, the surfaces of which may be associated with hydrated oxides of aluminum, titanium and, for example, silicon, have been washed substantially free from soluble salts and partially dried to give a filter cake of approximately 60 percent by weight solids content.

The particles of titanium dioxide that may be used in the process of the invention must, of course, be treated in accordance with the invention after any operation, such as calcination, has been carried out on the particles that would, if carried out after the treatment, destroy the effect of the compound on the particles. The particles of titanium dioxide have preferably been subjected to a classification operation in order to obtain particles having sizes within a particular range. The particles of titanium dioxide are advantageously treated after the classification treatment and before the step of drying the particles in the normal process for the production of titanium dioxide pigment. Alternatively, the particles may be treated during a wet milling operation and then dried.

The invention also provides, as a new composition of matter, pigment particles having retained thereon a cycloalkane compound having the following general formula:

$$\text{HO---R---}(C_nH_{2n}OH)_m$$

wherein R is a cycloalkane nucleus, $n$ is an integer of at least 1, $m$ is an integer of at least 2, and the hydroxyl group is attached directly to a ring carbon atom of said cycloalkane nucleus.

To illustrate this invention even more fully, the following specific examples are set forth. Throughout the specification and appended claims all parts and percentages are by weight unless otherwise indicated.

In the examples, 2,2,6,6-tetramethylolcyclohexanol is referred to, for convenience, as "TMC" and 2,2,6,6-tetramethylol-4-methyl-cyclohexanol as "TMMC."

In the examples and tables, the "percentage gloss" values set forth were obtained from measurements made using air-drying acrylic resin paints containing 37 percent by weight of the variously treated titanium dioxide pigment samples. In obtaining the values, the following procedure was used. A beam of light was shone on a black tile at an angle of incidence of 45°. The reflectance of that beam was measured. Films of the air-drying paints, containing the variously treated pigments, were applied to sheets of cellophane. A beam of light was shone on each of those films at an angle of incidence of 45°. In each instance, the reflectance of the beam was measured.

$$\frac{\text{Reflectance of the paint film}}{\text{Reflectance of the black tile}} \times 100\% = \text{Percentage gloss}$$

In the examples and tables, the "hiding power" values set forth were obtained from measurements made on air-drying acrylic resin paints containing 37 percent by weight of the variously treated titanium dioxide pigment samples. The method used in obtaining the values is that described in the American Society for Testing Materials publication D1738-60T, issued in 1960, with the substitution of Imperial gallons for U.S. gallons where appropriate. Any particular "hiding power" value represents the number of square feet of surface over which an Imperial gallon of the paint can be uniformly spread to produce a contrast ratio of c.=0.98, the "contrast ratio" being defined in the ASTM publication.

EXAMPLE 1

Rutile titanium dioxide pigment particles were surface coated in a known manner such that hydrated silica and hydrated alumina were intimately associated with the surface of the particles in amounts equivalent to 0.5 percent $SiO_2$ and 1.0 percent $Al_2O_3$, based on the weight of the pigment. After washing substantially free from soluble salts arising from the surface treatment process, the slurry of coated titanium dioxide particles was partially dried by filtration to give a filter cake of approximately 60 percent by weight solids content. Uniform samples of this surface-coated titanium dioxide filter cake were treated as follows:

(A) The first sample was dried at 120° C. for 16 hours and then milled in a fluid energy mill.

(B) A second sample was mixed in a paste blender with 0.3 percent of pentaerythritol, based on the weight of the pigment, the pentaerythritol being added as a solution in the minimum amount of water. Mixing was continued for 30 minutes, by which time the additive was evenly distributed throughout the pulp. The mixture was dried at 120° C. and milled in a fluid energy mill. Samples were also prepared in a similar manner with pentaerythritol additions of 1.0 percent and 3.0 percent based on the pigment.

(C) Three samples were prepared as described in B, above, with additions of 0.3 percent, 1.0 percent, 3.0 percent by weight, respectively, of tetramethylol cyclohexanol dissolved in the minimum amount of water before addition to the pulp in the mixer.

(D) Three further samples were prepared as described in B, above, with additions of 0.3 percent, 1.0 percent, 3.0 percent by weight, respectively, of technical tetramethylol methyl cyclohexanol (a liquid), based on the pigment, directly to the mixer.

The dried, milled samples were then incorporated in polystyrene by tumble-mixing a mixture of granular polystyrene and titanium dioxide pigment containing 1.0 percent of pigment, based on the weight of the polystyrene, for 10 minutes followed by injection moulding at 150° C. under a pressure of 2.5 tons per square inch. The resulting moulded discs were hot pressed at a pressure of 15 tons per square inch for 20 seconds between machined plates at 225° C. surface temperature when thin films of uniform thickness were obtained. The pigmented films were visually compared for opacity and were accorded an opacity rating as shown in Table 1, below; the value 5 being assigned to the least opaque and the value 1 to the most opaque, intermediate values being interpolated. For pigment samples prepared from the same sample of surface coated titanium dioxide pulp, this rating also serves as the rating for "ease of dispersion." Thus, "1" indicates greater ease of dispersion and greater opacity than "2," and so on.

TABLE 1

| Additive (percentage by weight): | Opacity rating |
|---|---|
| (A) | |
| None | 5 |
| (B) | |
| Pentaerythritol: | |
| 0.3 | 5 |
| 1.0 | 3 |
| 3.0 | 4 |
| (C) | |
| TMC: | |
| 0.3 | 3 |
| 1.0 | 2 |
| 3.0 | 2 |

(D)
TMMC:
0.3 ------------------------------------ 2
1.0 ------------------------------------ 1
3.0 ------------------------------------ 4

The data in Table 1 shows that a greater ease of dispersion and a greater opacity rating is obtained using pigment particles treated with the cycloalkane compounds of this invention, in the manner here disclosed, as compared with comparable particles treated with a polyol such as pentaerythritol.

EXAMPLE 2

A rutile titanium dioxide pigment was surface coated in a known manner with 1.5 percent of hydrated titania, 1.0 percent of hydrated silica and 1.5 percent hydrated alumina (all calculated as oxides, based on the weight of the pigment). After washing substantially free from soluble salts, the slurry of coated TiO₂ was dewatered to give a filter cake of approximately 60 percent solids content. Uniform samples of this filter cake were treated with tetramethylol cyclohexanol and tetramethylol methyl cyclohexanol at 0.25 percent and 1.0 percent by weight levels as described in Example 1 and an untreated sample was also dried and milled in a fluid energy mill.

The dispersion of these pigments by ball milling was examined in the following manner:

90 grams of TiO₂ were mixed with 22.5 grams of Linseed Stand Oil having a viscosity of 4 poise at 20° C. and 22.5 grams of an 8:1 (by weight) mixture of mineral spirits and xylene in a glass bottle of 8 fluid ounces capacity. 150 grams of ⅜" "Steatite" balls were added. The glass bottle was turned on rollers at a speed of 100 r.p.m. for 1½ hours and the dispersion of the pigment was evaluated using a Hegman gauge as described below in connection with the "Kady" mill test. Values of film thickness in microns at which agglomerates began to protrude through the paint film surface are given in Table 2, below.

In Table 2 the "Blank" sample was subjected to the same mixing treatment as was used to incorporate the organic treating agent with the pigment.

TABLE 2

| Treating agent | Ball mill dispersion test (1½ hours) ($\mu$) | Hiding power | Percentage gloss |
|---|---|---|---|
| Blank | 19 | 378 | 54 |
| 0.25% TMC | 10 | 407 | 64 |
| 1.0% TMC | 24 | 436 | 63 |
| 0.25% TMMC | 8 | 436 | 63 |
| 1.0% TMMC | 11 | 407 | 66 |
| 0.25% Pentaerythritol | 27 | 385 | 50 |
| 1.0% Pentaerythritol | 13 | 378 | 52 |

EXAMPLE 3

A rutile titanium dioxide pigment made by the vapor phase oxidation of titanium tetrachloride was surface coated with 1.0 percent of hydrated alumina and 1.0 percent of hydrated titania (calculated as Al₂O₃ and TiO₂, respectively, based on the weight of the pigment). After the final washing stage, filter cake was prepared and then treated with 0.5 percent and 1.0 percent by weight of TMC and TMMC, respectively, as described in Example 1. The dried samples, including a dried sample of untreated filter cake, were milled in a fluid energy mill.

The resulting pigments were tested for dispersibility in a surface coating medium as follows: 225 parts by weight of the treated pigment particles were mixed with 215 parts by weight of a linseed oil paint comprising linseed oil-pentaerythritol-modified alkyd resin, soya lecithin oil and mineral spirits in the weight proportions of 100:20:570, respectively. The mixing was carried out in a high speed dispersion paint mill known as a "Kady" mill. After a 7 minute milling period a sample of the paint was withdrawn and tested on a Hegman gauge for fineness. The values in the table give the depth (thickness) of the paint film in microns at which agglomerates began to protrude through the paint film. The smaller this thickness, the better the dispersion of the pigment in the medium. The results are set forth in Table 3, below.

TABLE 3

| Treating agent | High Speed dispersion mill (7 minutes)($\mu$) | Hiding power | Percentage gloss |
|---|---|---|---|
| Blank | 31 | 436 | 60 |
| 0.5% TMC | 19 | 450 | 76 |
| 1.0% TMC | 23 | 472 | 76 |
| 0.5% TMMC | 25 | 443 | 68 |
| 1.0% TMMC | 15 | 450 | 73 |
| 1.0% Pentaerythritol | 25 | 458 | 74 |

As will be understood by those skilled in the art, what has been described are preferred embodiments of the invention, however, many modifications and changes can be made therein without departing from the spirit and scope of the following claims.

What is claimed:

1. A process for the treatment of inorganic pigment particles which comprises intimately admixing said particles with from about 0.01 to 5.0 percent by weight, based on the weight of said particles, of a cycloalkane compound while the latter is in a liquid state, and thereafter drying the particles, said cycloalkane compound having the following general formula:

$$HO\text{---}R\text{---}(C_nH_{2n}OH)_m$$

wherein R is a cycloalkane nucleus, $n$ is an integer of at least 1, $m$ is an integer of at least 2, and the hydroxyl group is attached directly to a ring carbon atom of said cycloalkane nucleus.

2. A process as set forth in claim 1 in which said cycloalkane nucleus R is selected from the group consisting of cyclopentyl, cyclohexyl, substituted cyclopentyl and substituted cyclohexyl nuclei.

3. A process as set forth in claim 1 in which said cycloalkane compound has at least 1 hydroxylalkyl group attached to a ring carbon atom immediately adjacent to another ring carbon atom having an hydroxyl group attached thereto.

4. A process as set forth in claim 1 wherein $m$ is an integer from 2 to 4 and $n$ is an integer of from 1 to 3 carbon atoms.

5. A process as set forth in claim 1 wherein the cycloalkane compound is further substituted by at least one substituent independently selected from the group consisting of halogen, alkyl and amino substituents.

6. A process as set forth in claim 1 wherein the cycloalkane compound has the formula:

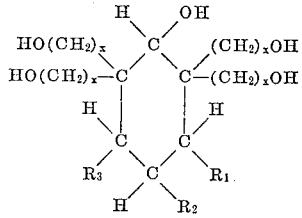

wherein $R_1$, $R_2$ and $R_3$ are independently selected from the group consisting of hydrogen and alkyl; and $x$ is an integer from 1 to 3.

7. A process as set forth in claim 1 in which the cycloalkane compound has the formula:

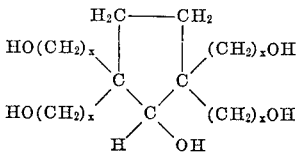

wherein $x$ is an integer of from 1 to 3.

8. A process as set forth in claim 1 wherein the cycloalkane compound is a compound selected from the group consisting of 2,2,6,6-tetramethylol-cyclohexanol;

2,2,6,6 - tetramethylol - 4 - methylcyclohexanol; 2,2,5,5-cyclopentanol; 2,2,6,6-tetramethylol - 3,4 - dimethylcyclohexanol and 2,2,6,6-tetra(3-hydroxypropyl)cyclohexanol.

9. A new composition of matter comprising inorganic pigment particles having retained thereon from about 0.01 to 5.0 percent by weight, based on the weight of said particles, of a cycloalkane compound having the following general formula:

$$HO-R-(C_nH_{2n}OH)_m$$

wherein R is a cycloalkane nucleus, $n$ is an integer of at least 1, $m$ is an integer of at least 2, and the hydroxyl group is attached directly to a ring carbon atom of said cycloalkane nucleus.

References Cited
UNITED STATES PATENTS 3,129,053    4/1964    Castle.

JAMES E. POER, *Primary Examiner.*

U.S. Cl. X.R.

106—309

UNITED STATES PATENT OFFICE
CERTIFICATE OF CORRECTION

Patent No. 3,436,241 April 1, 1969

George G. Durrant

It is certified that error appears in the above identified patent and that said Letters Patent are hereby corrected as shown below:

In the heading to the printed specification, lines 3 and 4, "Falchenham Cottage, Stallingborough Road, Healing, Lincolnshire, England" should read -- Healing, Lincolnshire, England, assignor to Laporte Titanium Limited, London, England, a company of Great Britain --.

Signed and sealed this 31st day of March 1970.

(SEAL)
Attest:

Edward M. Fletcher, Jr.

Attesting Officer

WILLIAM E. SCHUYLER, J

Commissioner of Patent